United States Patent [19]

Hillier

[11] 4,358,008
[45] Nov. 9, 1982

[54] KEEL ROLLER

[76] Inventor: Raymond G. Hillier, 159 Boniface St., Coopers Plains, Brisbane, Queensland, Australia, 4108

[21] Appl. No.: 197,941

[22] Filed: Oct. 17, 1980

[51] Int. Cl.$^3$ ............................................. B65G 13/00
[52] U.S. Cl. ................................................... 193/37
[58] Field of Search ............... 414/529; 193/35 C, 37; 198/785, 840; 280/414 R, 414 B; 29/121.1, 121.4, 122, 127, 128; 9/1.2

[56] References Cited

U.S. PATENT DOCUMENTS

| | | | |
|---|---|---|---|
| 1,749,146 | 3/1930 | Maison | 29/121.1 |
| 2,797,008 | 6/1957 | Banker | 414/529 |
| 2,965,252 | 12/1960 | Morsch | 414/529 |
| 3,035,723 | 5/1962 | Brosch | 414/529 |
| 3,333,861 | 8/1967 | Hoffman | 9/1.2 |
| 3,860,780 | 1/1975 | Conrad | 29/121.4 |

Primary Examiner—Trygve M. Blix
Assistant Examiner—Thomas J. Brahan

Attorney, Agent, or Firm—Schwartz, Jeffery, Schwaab, Mack, Blumenthal & Koch

[57] ABSTRACT

This invention relates to a keel roller for a boat trailer which includes an elongate body rotatably mountable on the trailer. The body is characterized by having a centrally located peripheral groove and opposed side portions each of which are located adjacent the groove. Each side portion comprises oppositely handed helical threads thereby providing a plurality of hills and valleys. The height of each hill decreases progressively toward the centrally located groove so that the periphery of each side portion converges or tapers inwardly towards the centrally located groove. Each hill is substantially arcuate so that when a boat is drawn onto the trailer from its rear with the boat keel on the roller, the tapered oppositely threaded side portions of the elongate body produce a gravitational sliding effect whereby the keel, if displaced from the centrally located groove, readily attains its original position in the groove to thereby reduce fouling of the keel to a minimum when the boat is drawn onto the trailer.

3 Claims, 2 Drawing Figures

KEEL ROLLER

BACKGROUND OF THE INVENTION (1) Field of the Invention

This invention relates to an improved keel roller for a boat trailer or the like.

(2) Description of the Prior Art

A boat trailer normally has at the rear a centrally mounted keel roller, over which the keel of the boat is run when the boat is being winched onto the trailer. In some cases, two keel rollers are provided, one in front of the other, the two being mounted between rocker arms or on an equivalent arrangement so that the two rollers will support a part of the boat keel, whatever its angle to horizontal.

Commonly, difficulty is experienced in accurately centering or aligning the keel of a boat on the roller or rollers, accurate alignment being necessary so that the boat, when winched onto the trailer, will be correctly supported by the means provided. The boat, when being drawn from the water, may tend to swerve to one side or the other, particularly if there is a strong wind, and great difficulty may be experienced in ensuring that the keel runs along the central part of the roller or rollers.

BRIEF SUMMARY OF THE INVENTION

The present invention has been devised with the general object of overcoming this difficulty by providing a keel roller for a boat trailer which will tend to centre the keel of a boat winched onto the trailer.

With the foregoing and other objects in view, the invention resides broadly in a keel roller for a boat trailer including an elongate body capable of being rotatably mounted on a boat trailer, said body having a centrally located peripheral groove and opposed side portions each of which are located adjacent said groove and comprise oppositely handed helical threads thereby providing a plurality of hills and valleys, the height of each hill decreasing progressively toward the centrally located groove so that the periphery of each side portion converges or tapers inwardly toward the centrally located groove which is of less diameter than the remainder of the body, each hill being substantially arcuate whereby when a boat is drawn onto the trailer from its rear with the boat keel on the roller the tapered oppositely threaded side portions of the elongate body produce a gravitational sliding effect whereby the keel if displaced from the centrally located groove readily attains its original position in the peripheral groove to thereby reduce fouling of the keel to a minimum when the boat is drawn onto the trailer.

BRIEF DESCRIPTION OF SEVERAL VIEW OF THE DRAWINGS

In order that a preferred embodiment of the invention may be readily understood and carried into practical effect, reference is now made to the accompanying drawings, wherein.

DETAILED DESCRIPTION OF THE PREFERRED EMBODIMENTS

Figure 1:
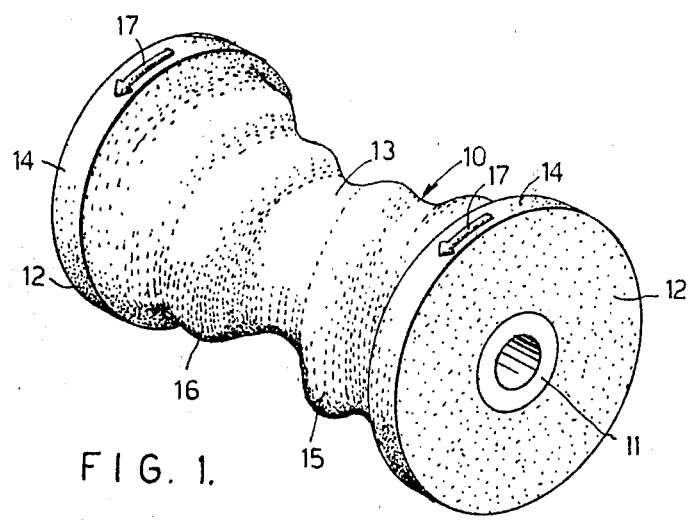
FIG. 1 is a perspective view of a keel roller according to the invention.

The keel roller illustrated includes a body 10 moulded of rubber or other somewhat resilient and yieldable material, being formed about a coaxial bush 11, which is made of metal, such as stainless steel or brass, which is not liable to undue corrosion as a result of exposure to sea water.

The roller body 10 is formed with disc-shaped sides 12, the part of the body between these sides being of lesser diameter, and furthermore tapering from both sides to a round-section central part 13. The outer parts of the two sides of the roller body constitute stop flanges 14.

Between each of the two sides 12 of the roller body and the reduced diameter central part 13, the roller body is formed with about two complete convolutions of a thread, that is to say one part is formed with a right-hand thread, as indicated at 15, and the other part is formed with a left-hand thread, as indicated at 16.

Figure 2:
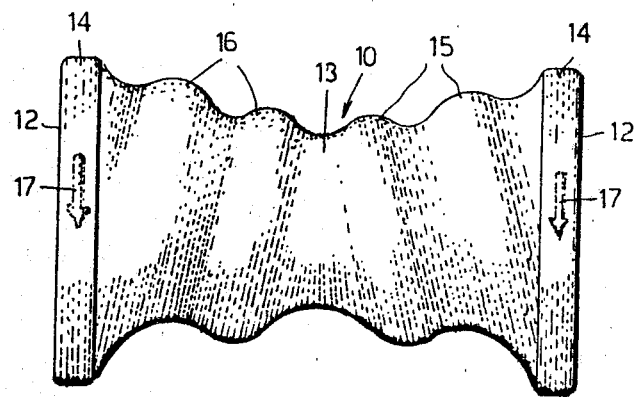
FIG. 2 is a front elevational view of the roller shown in FIG. 1.

The roller is installed at the rear of a boat trailer, its bush 11 being rotatably mounted on a transverse shaft carried by a mounting bracket not shown at the rear of the trailer. The roller is so installed that, as shown in FIG. 2, when viewed from the front the right-hand threaded part 15 of the body is to the right, the left-hand part 16 being to the left.

The central part 13 is suitably arcuate in cross-section and the peaks of threads 15 and 16 and the lowermost point of central part 13 are substantially collinear.

When a boat is being drawn from the water onto the trailer in usual manner, by means of a winch, the keel of the boat is brought onto the roller and, as the boat is winched forwards, the roller is thereby rotated in such manner that the keel, if initially resting on one side or the other of the roller, will quickly be brought to a central position owing to the right-hand and left-hand threaded configuration of the roller body.

To assist in the correct installation of the roller, the stop flanges 14 are formed with embossed arrows 17, showing the direction in which the roller should be rotated as a boat is being winched up onto the trailer.

In a trailer fitted with a tandem assembly of two rollers, one in front of the other, the two rollers according to the invention are similarly arranged to bring about the same result when the boat is winched into place.

When a boat is being launched from the trailer into the water, the roller will, of course, be rotated in reverse direction, but at this time there are not likely to be any forces acting on the boat to cause it to do other than run straight, its keel remaining engaged with the central unthreaded and reduced-diameter part 13 of the roller body. It is only when a boat is being winched onto a trailer that problems of centering the boat keel on the boat trailer roller arise.

I claim:

1. A keel roller for a boat trailer including an elongate body capable of being rotatably mounted on a boat trailer, said body having a centrally located peripheral groove and opposed laterally extending side portions located adjacent said groove, said side portions comprising oppositely handed helical threads thereby providing a plurality of hills and valleys, the height of each hill decreasing progressively toward the centrally located groove so that the periphery of each side portion converges or tapers inwardly toward the centrally located groove which is of less diameter than the remainder of the body, the successive vertices of each hill of each respective side portion and the lowermost point of the centrally located groove being substantially collinear, each hill being substantially arcuate and each valley being concave, whereby when a boat is drawn onto the trailer with the boat keel on the roller, the tapered oppositely threaded side portions of the elongate body produce a gravitational sliding effect whereby the keel, if displaced from the centrally located groove, readily attains its original position in the peripheral groove to thereby reduce fouling of the keel to a minimum when the boat is drawn onto the trailer.

2. A keel roller as claimed in claim 1 wherein both sides of the roller body are formed with peripheral flanges extending outwardly beyond the oppositely threaded parts.

3. A keel roller as claimed in claims 1 or 2 wherein the centrally located groove is substantially arcuate in cross section.

* * * * *